United States Patent [19]

Zysman et al.

[11] Patent Number: 4,545,690
[45] Date of Patent: Oct. 8, 1985

[54] TEMPERATURE MEASUREMENT PROBE FOR CHEMICAL REACTIONS AND METHOD OF USE THEREOF

[75] Inventors: Lawrence J. Zysman, Brea; Malbone W. Greene, Vista, both of Calif.

[73] Assignee: Beckman Instruments, Inc., Fullerton, Calif.

[21] Appl. No.: 509,901

[22] Filed: Jun. 30, 1983

[51] Int. Cl.$^4$ .................. G01K 1/14; G01K 7/16
[52] U.S. Cl. .................. 374/165; 338/28; 374/141; 374/183; 422/51; 436/147
[58] Field of Search .............. 374/185, 165, 183, 141; 436/147; 435/3; 338/28; 422/108, 109

[56] References Cited

U.S. PATENT DOCUMENTS

| | | | |
|---|---|---|---|
| 2,238,015 | 4/1941 | Doll | 374/165 |
| 3,295,353 | 1/1967 | Hagen | 374/185 X |
| 3,456,490 | 7/1969 | Stone | 374/11 |
| 3,713,774 | 1/1973 | Southwick | 422/75 X |
| 3,747,396 | 7/1973 | O'Neill | 374/11 |
| 3,798,431 | 3/1974 | Schulkind et al. | 422/108 X |
| 3,899,782 | 8/1975 | Miller et al. | 374/110 |
| 3,934,477 | 1/1976 | Thetty | 374/165 |
| 4,167,450 | 9/1979 | Chesbro et al. | 435/3 |
| 4,224,405 | 9/1980 | Hijikata | 435/3 |
| 4,321,827 | 3/1982 | Anderson | 374/165 X |

FOREIGN PATENT DOCUMENTS

| | | |
|---|---|---|
| 1573239 | 9/1970 | Fed. Rep. of Germany . |
| 2219405 | 9/1974 | France . |
| 0807232 | 1/1959 | United Kingdom . |

*Primary Examiner*—Daniel M. Yasich
*Attorney, Agent, or Firm*—W. H. May; A. Grant; G. T. Hampson

[57] ABSTRACT

An apparatus and method for indicating the temperature of the environment into which a reaction vessel may be placed is provided by a container holding a thermally efficient fluid. The container has an identical external configuration substantially identical to the reaction vessel and is adapted to be positioned within the environment in place of the reaction vessel. A temperature sensor in thermal communication with the thermally efficient fluid provides an electrical parameter indicating the temperature of such fluid and thus the environment of the reaction vessel.

8 Claims, 7 Drawing Figures

| METER READING | °C | METER READING | °C |
|---|---|---|---|
| 1999 | 28.50 | 1535 | 34.10 |
| 1982 | 28.70 | 1523 | 35.20 |
| 1966 | 28.90 | 1511 | 35.40 |
| 1958 | 29.00 | 1499 | 35.61 |
| 1950 | 29.10 | 1488 | 35.80 |
| 1942 | 29.20 | 1476 | 36.00 |
| 1934 | 29.30 | 1470 | 36.10 |
| 1926 | 29.40 | 1464 | 36.21 |
| 1918 | 29.50 | 1459 | 36.30 |
| 1914 | 29.55 | 1453 | 36.40 |
| 1910 | 29.60 | 1447 | 36.50 |
| 1906 | 29.65 | 1444 | 36.60 |
| 1902 | 29.70 | 1441 | 36.61 |
| 1898 | 29.75 | 1439 | 36.65 |
| 1894 | 29.80 | 1436 | 36.70 |
| 1890 | 29.85 | 1433 | 36.75 |
| 1886 | 29.91 | 1430 | 36.80 |
| 1882 | 29.96 | 1427 | 36.81 |
| 1879 | 30.00 | 1425 | 36.90 |
| 1875 | 30.05 | 1422 | 36.91 |
| 1871 | 30.10 | 1419 | 37.00 |
| 1867 | 30.15 | 1416 | 37.01 |
| 1863 | 30.20 | 1413 | 37.10 |
| 1859 | 30.26 | 1410 | 37.20 |
| 1856 | 30.30 | 1408 | 37.21 |
| 1852 | 30.35 | 1405 | 37.25 |
| 1848 | 30.40 | 1402 | 37.30 |
| 1844 | 30.45 | 1400 | 37.31 |
| 1840 | 30.51 | 1397 | 37.40 |
| 1833 | 30.60 | 1394 | 37.50 |
| 1825 | 30.71 | 1391 | 37.51 |
| 1818 | 30.80 | 1386 | 37.61 |
| 1811 | 30.90 | 1381 | 37.70 |
| 1803 | 31.00 | 1376 | 37.80 |
| 1789 | 31.20 | 1371 | 37.90 |
| 1774 | 31.40 | 1366 | 37.10 |
| 1760 | 31.60 | 1353 | 38.20 |
| 1745 | 31.81 | 1342 | 38.40 |
| 1732 | 31.99 | 1331 | 38.60 |

FIG. 7

TEMPERATURE MEASUREMENT PROBE FOR CHEMICAL REACTIONS AND METHOD OF USE THEREOF

TECHNICAL FIELD

This invention is related to systems and methods for accurately measuring the environmental temperature of a volumetric space in which a chemical reaction is generated.

BACKGROUND ART

Systems and methods for accurately measuring temperature perform an important function in measurements and analysis techniques used in science. Accurate measurement of temperature is often necessary in order to obtain accurate data of physical, electrical and chemical events. For instance, many chemical analyses are performed by a measurement of the time required for a chemical reaction to take place. Such time measurements have important relationships to specific measurable values characteristic of unknown components in the chemical reaction.

Generally, time dependent measurements in chemical analysis are directly related to the temperature at which the reaction takes place. The exact temperature at which a reaction occurs must be known to obtain accurate analysis results. Accurate temperature control and measurement is necessary due to the variable rates at which a reaction may progress with changes in temperature in which the reaction occurs. Increased temperatures generally increase the rate at which the chemical reaction occurs due to increased molecular activity associated with increased heat energy levels.

If time related measurements used in certain analytical procedures are to be reliable, accurate temperature control and measurement must be obtained. It is often necessary to obtain a repeatable temperature environment with accuracy to identically reproduce a selected reaction. A lack of temperature control will most certainly result in inaccuracies in any time dependent analysis.

Generally, temperature measurement and control is obtained by measurement of an element of the environment in which the chemical reaction will be, or is, taking place. For example, a measurement may be taken of the air closely surrounding the reaction vessel. More commonly, the temperature measurement is made of a structural member in which the reaction vessel is held. Theoretically, the temperature of the structural member for the reaction vessel closely approximates the temperature of the reaction vessel in which the chemicals are placed. This in turn closely approximates the temperature of the chemicals contained.

Inaccuracies are inherent in these measurement methods, however, due to differing thermal coefficients of materials, nonuniform surface contact, heat dissipation from exposed surface areas, and an inability to obtain measurement very near the point of interest, i.e. where the reaction takes place.

It is also known to make temperature measurements with a probe inserted directly into the reaction vessel and contacting the chemical in reaction. In order to prevent cross contamination between successively measured reactions, the probe must be carefully cleaned after every measurement. Furthermore, heat energy generated by the reaction may affect the measurement of steady state temperature values which must be known to control the process of the reaction.

DISCLOSURE OF THE INVENTION

The present invention is a temperature measurement apparatus and a method by which the temperature of fluids contained in a reaction vessel may be accurately predicted. Applicant's invention permits accurate indication of the temperature environment of the precise location in which a chemical reaction of fluids will be conducted.

Applicant's invention comprises a fluid container having a shape the same as that of a reaction vessel in which the chemical reaction will be performed. Due to its identical shape, the container may be placed for temperature measurement in the same location as a reaction vessel will be placed to conduct the chemical reaction. The container holds a volume of liquid which possesses high thermal conductivity which permits heat energy to be easily transferred through the liquid in a short period of time. This permits thermal equilibrium to be quickly obtained throughout the volume of contained liquid.

A semiconductor temperature sensing probe is submerged in the liquid within the fluid container. The resistance value presented by the probe is proportional to the temperature of the liquid in the container. Therefore, an electrical signal conducted by the sensing probe will vary in value according to Ohms law with changes in liquid temperature.

The temperature sensing probe is connected to an electrical circuit which incorporates two means for calibration of the signal obtained from the probe to produce an output signal which accurately indicates the temperature of the liquid in the container.

Since the fluid container is placed in the same position as a reaction vessel in which a chemical reaction will be conducted, the temperature of the fluid held within the container will accurately indicate the temperature of the chemical reactants at the time the reaction takes place.

The semiconductor temperature probe is connected to the electrical circuit by a flexible thermal insulating terminal. This assures that no heat energy will be lost along the electrical conductors leading to the temperature probe, thus increasing accuracy of the temperature measurement obtained from the probe.

A first means of calibrating the electrical signal obtained from the semiconductor temperature probe comprises determining and selecting resistance elements for addition to the electrical circuit connected to the probe to accurately determine the resistance value of a first portion of the electrical circuit while the probe is maintained at a selected temperature near the mid point of the range of temperatures it will be required to measure. This calibration accurately determines the total electrical resistance of this portion of the circuit for a selected temperature, so that it may be used as a known reference against which differing resistance values indicating temperature may be measured.

A second means of calibration comprises providing a variable resistance element in a second portion of the electrical circuit connected to the temperature sensing probe. The electrical signal to be applied to the sensing probe is first switched through a third resistance element contained in the second portion of the circuit bypassing the first portion of the electrical circuit. The third resistance element has a resistance value equal to the selected value at which the first portion of the probe circuit is calibrated. It thus provides a steady state reference resistance by which the variable resistance element in the second portion of the circuit may be adjusted.

The variable resistance element is adjusted to incrementally increase the total resistance in the second portion of the circuit to bring a resistance measurement instrument connected to the circuit to a nominal reading. This assures that the resistance measurement instrument will indicate the nominal reading when the temperature probe is maintained at its calibration temperature when the variable resistance element is connected with the first portion of the electrical circuit. Calibration provides a nominal reading of the measurement instrument and permits changes in resistance caused by changes in temperature to be easily and accurately measured. Given this accurate data of change in resistance of the temperature sensing probe, the exact temperature of the fluid which the probe measures may be accurately calculated.

The third resistance element is then removed from the electrical circuit, leaving the variable resistance element connected in the circuit with the first portion of the circuit.

DESCRIPTION OF THE DRAWINGS

FIG. 7 is a chart illustrating the change in resistance of the temperature measurement apparatus with varying temperature.

BEST MODE OF THE INVENTION

Figure 1:
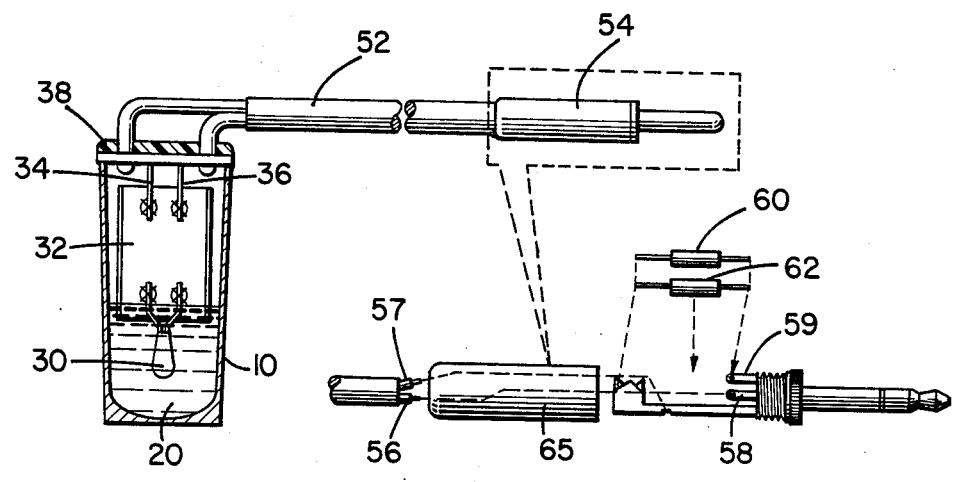
FIG. 1 depicts an assembled temperature measurement apparatus comprising a first subcircuit of the temperature sensing probe circuit, and illustrating the fluid container in cross section with the temperature probe in position therein.

FIG. 1 illustrates a first portion of Applicant's temperature sensing apparatus corresponding to a first subcircuit. A fluid container 10 is made of a polycarbonate or acrylic material, each being a generally known material in the technical art. These materials are selected for their thermodynamic ability to easily pass heat energy. Thus, heat energy will be easily passed through container 10 between a supporting structure (not shown) which contacts and supports the external surface of the container 10 to hold it in position and a liquid 20 held within the container. Efficient thermodynamic response permits the liquid or fluid 20 within the container to easily receive or pass heat energy from or to the environment surrounding the container 10.

The liquid 20 held within the container 10 is selected for a thermodynamic property of high transferability of heat energy. This permits the liquid to rapidly accept or reject heat energy due to temperature differences between the fluid 20 and the surrounding environment which thermally communicates through the container 10. The fluid is preferably a silicon oil which is manufactured by The Dow Corning Company, and may be identified as Part Number 65-006-11 of Beckman Instruments, Inc., Fullerton, Calif.

The temperature sensing probe 30 is a semiconductor electrical element which varies electrical resistivity proportionally with changes in the temperature environment in which it is placed. Thus, resistance to an electrical current passed through the probe 30 will vary in proportion to changes in temperature of the liquid 20 in which it is submersed. Such a semiconductor temperature probe is known as a thermistor and consists of a sintered mixture of such oxides as $NiO$, $Mn_2O_3$, and $Co_2O_3$. The change in resistance (or as an inverse relation conductivity) may be found to be in a range of 6% to 10% per degree change in temperature. The magnitude of this change is easily measurable to provide an accurate indication of the temperature of the environment surrounding the probe. A thermistor used by applicant is Part No. 44033 manufactured by the Yellow Springs Instrument Company.

Figure 2:
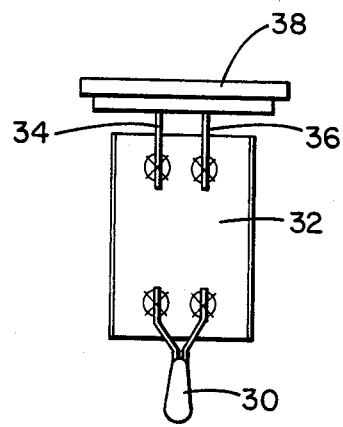
FIG. 2 is a side view of the flexible thermally insulating terminal through which the temperature sensing probe is connected into the electrical circuit.

The temperature sensing probe 30 is connected to the thermal insulating terminal 32, at one end, as illustrated in FIGS. 1 and 2. The opposing end of the terminal 32 provides leads 34, 36 which extend through a cap 38. The cap 38 is sized to provide a top closure for the fluid container 10.

The size and shape of the fluid container 10 is dependent upon the particular application to which the temperature measurement system will be applied. The fluid container 10 should comprise the exact exterior dimensions of a reaction vessel in which a chemical reaction will be conducted. Thus, the fluid container will properly fit into an analysis instrument in the same location with the same fit as the reaction vessel so that it will be exposed to the identical environmental temperatures as will the reaction vessel when the chemical reaction is taking place.

As shown in FIG. 1, the cap 38, terminal 32 and probe 30 assembly is inserted into the fluid container 10 to submerge the probe 30 into the fluid 20, with the cap 38 engaging and sealing the top of the fluid container 10. The cap 38 is sealed to the fluid container 10 to securely enclose the liquid 20 contained within the fluid container 10 and prevent leakage of the fluid from the container. The cap 38 may be sealed to the container by a number of methods and substances generally known. Applicant has selected to use both epoxy and silicon sealants to assure a high strength bond and a leak proof seal.

Figure 3:
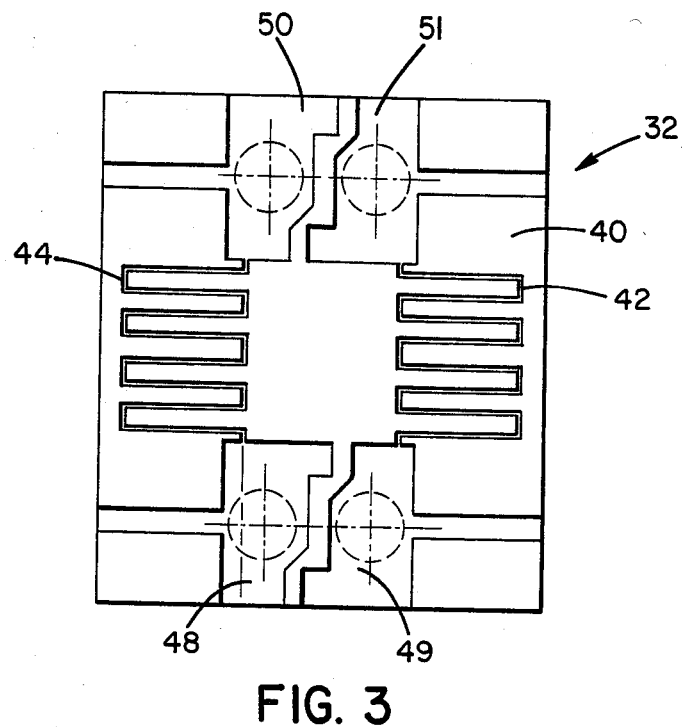
FIG. 3 illustrates side views of the temperature sensing probe and insulating terminal assembly.

Referring to FIG. 3, the structure of the thermal insulating terminal 32 may be described. The terminal 32 comprises a flexible board 40 made of Kapton material manufactured by the DuPont Company. The Kapton board is preferably 0.0005 inches thick. The board is coated on one side with constantan alloy to provide a 0.0005 inch thick layer and chemically etched to form two individual conductors 42 and 44. Each conductor 42 or 44 has a generally large pad, 48 through 51, at each end to which electrical connections can be easily made. Between the pads 48, 49 and 50, 51 respectively, each conductor 42, 44 is constructed in a narrow serpentine path. The narrow width in combination with the shallow depth of the conductor material provides a very small area through which heat energy can be conducted. The serpentine path of the conductors 42, 44 provide additional length to the conductors to resist thermal conductivity along the conductors. These two features combine to substantially eliminate thermal conductivity from the lower pads 48 and 49 pads to the upper 50 and 51, thus thermally insulating the probe 30 connected to the lower two pads 48 and 49 from electrical conductors connected to the upper two pads 50 and 51. This assures that heat energy applied to the temperature probe 30 by the fluid 20 in which it is submerged will not be lost through the conductors 42 and 44 connecting the probe 30 to its electrical circuit. This substantially increases the accuracy with which small changes in temperature can be measured.

Referring again to FIG. 1, the leads 34, 36 extending through the cap 38 are connected to a single pair cable 52 which leads to a pin plug connector 54 for connection of the temperature sensing probe 30 with the second subcircuit of the electrical circuit. The pin plug 54 comprises two electrical leads. One of the conductors 56 of the cable 52 leading from the temperature probe 30 is connected to a first lead 58 of the pin plug 54. The second conductor 57 of the cable 52 connects to the second lead 59 of the pin plug 54 through a plurality of resistors 60–62 (only two shown) which are selected during calibration of the first subcircuit of the temperature probe assembly. A cap 65 is fitted around the cable 52 and over the back portion of the pin plug 54 to enclose the resistors 60–62 and the electrical connection to the plug 54, as is commercially known.

Figure 5:
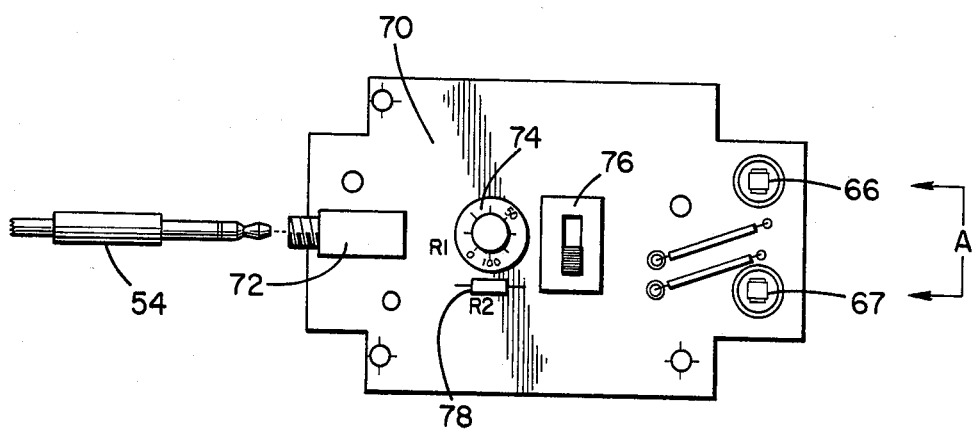
FIG. 5 illustrates an intermediary calibration apparatus comprising a second subcircuit of the temperature sensing probe circuit.
Figure 4:
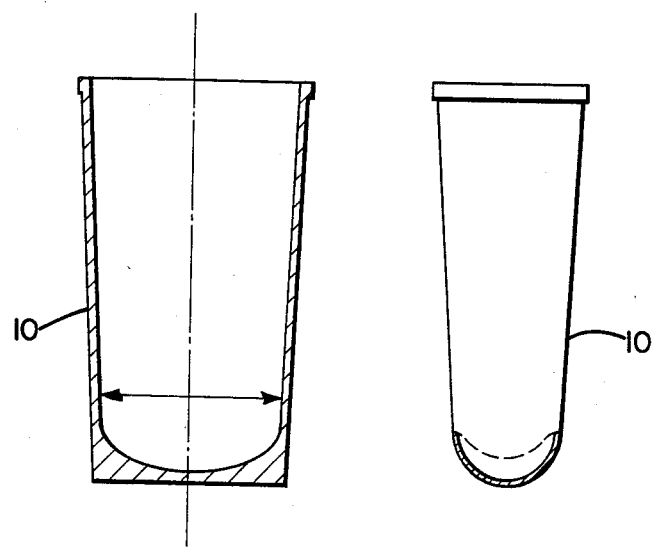
FIG. 4 illustrates a typical fluid container into which the temperature probe is positioned.
Figure 6:
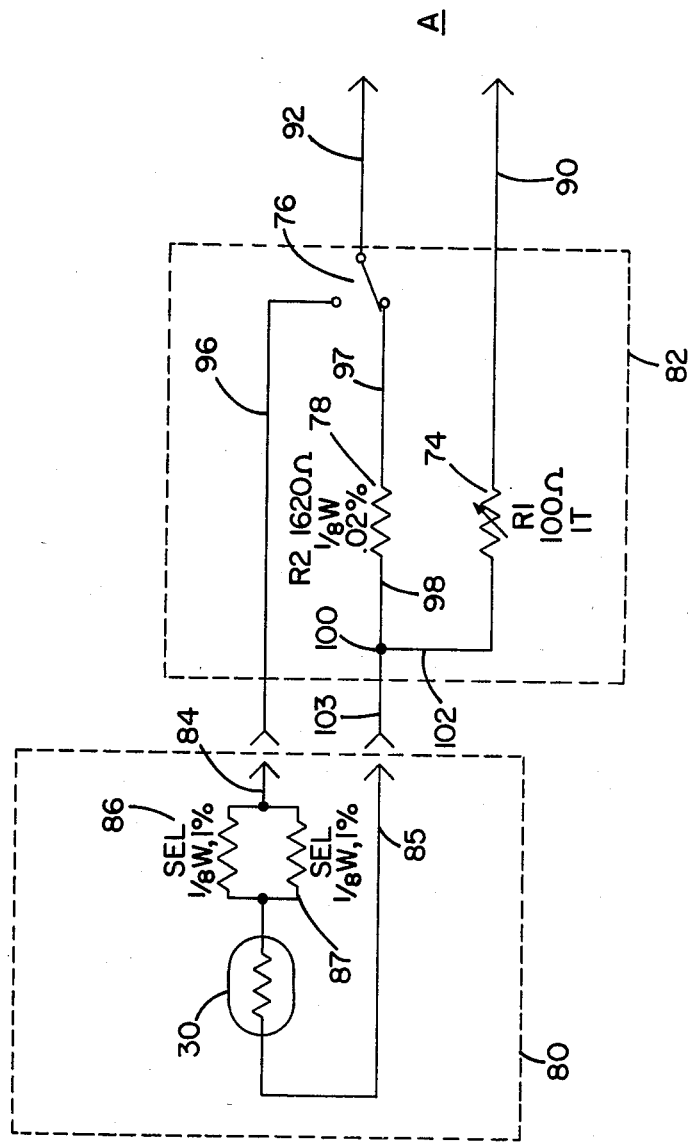
FIG. 6 is a schematic of the entire electrical circuit of the temperature measurement apparatus comprising the invention.

Referring to FIG. 5, the component structure comprising a second portion of the temperature measurement system and incorporating the second subcircuit may be described. This portion of the system comprises a printed circuit board 70, which mounts a jack 72 for receiving the pin plug 54 on one end and a pair of pin connectors 66 and 67 for connection with a resistance measurement instrument (indicated as A). One of the pin connectors 66 is directly connected to a variable resistance element or rheostat 74. The other pin connector 67 is connected to a single throw double poll switch 76. One poll of the switch 76 directly connects to one lead of the jack 72 via conductor 96 (FIG. 6). The other poll of the switch 76 is connected to a resistor element 78. Conductors 102, 98 leading from the rheostat 74 and from the resistor element 78 form a junction 100 and are connected via conductor 103 to the second lead of the jack 72. Thus, when the pin plug 54 is inserted into the jack 72, a conductor from the switch 76 will be connected to one of the conductors of the cable 52 leading to the temperature probe 30 and the connected conductors from the resistor element 78 and the rheostat 74 will be connected to the other of the conductors of the cable 52 leading to the temperature probe 30.

Referring now to FIG. 6, the electrical schematic can be separated into two individual portions, the first subcircuit 80 illustrating the electrical schematic for the apparatus described with reference to FIG. 1, and the second subcircuit 82 illustrating the electrical schematic embodied in the apparatus described with reference to FIG. 5. The first subcircuit 80 of the schematic comprises the temperature probe or thermistor 30 to which two conductors 84, 85 are connected. One of the conductors 84 has a pair of selected resistors 86, 87 interconnected in parallel relationship. These resistors 86, 87 are selected during calibration of this portion of the electrical circuit to bring the total resistance of this portion of a selected value, while the temperature sensing probe 30 is maintained at a selected temperature. Preferably, the temperature sensing probe 30 will be maintained at 33.5° C. which will cause the preferred probe to have a resistance value of approximately 1585 ohms. Resistors 86 and 87 will then be selected to bring the total resistance of first subcircuit to 1620 ohms, thus obtaining a known resistance value at a known temperature. In the preferred form described, the resistance of this portion of the circuit will then vary between approximately 1420 ohms to 1880 ohms as the temperature is decreased from 37° C. to 30° C. as set forth in FIG. 7. This first calibration method accurately identifies the specific electrical resistances expected (or inversely the conductivity expected) for specific temperatures so that accurate temperature calculation can be easily accomplished through use of a resistance measuring instrument.

The schematic for the second subcircuit of the temperature measurement system comprises a first conductor 90 which leads from a resistance measurement instrument A to the variable resistance element or rheostat 74. A second conductor 92 leading from the measurement instrument A is connected to the switch 76. The switch 76 may alternately connect the second conductor 92 to the conductor 96 connected directly to the first subcircuit of the system or to the conductor 97 which connects to the resistance element 78. The resistance element 78 is selected for a resistance value equal to that at which the first subcircuit of the system is calibrated. The resistance element 78 connects through the conductor 98 to the junction 100 which connects to the conductor 103 leading from the rheostat 74. The conductor 102 is connected to the second lead entering the first subcircuit of the temperature measurement system.

Thus, to perform a second calibration to increase accuracy of the measurement system, the switch 76 is positioned to connect the conductor 92 from the measurement instrument with the resistance element 78 so that current flowing from the instrument passes through the resistance element 78 to junction 100 and through the conductor 102 to the rheostat 74 and back to the instrument A. The rheostat 74 is then adjusted to increase the resistance of this calibration subcircuit by a selected value over the resistance value of resistance element 78. The value of the selected increase is preferably in the range of 10 ohms and is adjusted to bring the indicator of the measuring instrument A to a nominal value to assist in ease of measurement.

Once this calibration is performed, the switch 76 is changed to connect the conductor 92 leading from the measurement instrument A with the conductor 96 leading to the first subcircuit of the analysis instrument. Since resistance element 78 is no longer in a completed portion of a circuit, it is effectively removed from any circuit. The current flowing from the measurement instrument A now flows along conductor 92 and through resistance elements 86 and 87 and the temperature probe 30, and then back through the variable resistance element 74 to the measurement instrument A. Because the first portion of the measurement system is calibrated at 1620 ohms, or the same value as resistance element 78 when the temperature to which the probe 30 is exposed is 33.5° C., the entire electrical circuit will equal the resistance value of the resistance element 78 or 1620 ohms, plus the additional resistance value provided by the variable resistance element 74 to indicate an identical reading on the resistance measurement instrument when the probe 30 is in a 33.5° C. environment. Thus, measured changes in resistance from the calibrated value of the first subcircuit or a preferred 1620 ohms will clearly indicate the temperature change to which the temperature probe is actually exposed, providing an accurate and exact temperature measurement.

Since the temperature probe 30 is submersed in an environment that is the same as that of the chemicals contained in a reaction vessel for reaction, the temperature probe 30 will clearly indicate the temperature at which the chemical reaction will take place, thus providing an accurate and effective means of determining the temperature of the environment which will be used for chemical analysis.

What is claimed is:

1. A method for indicating the temperature of an environment wherein said environment is adapted to receive and support a reaction vessel and said reaction vessel is adapted to hold chemicals during a chemical reaction, said method including the steps of:
   placing a container having an external shape and size substantially identical to said reaction vessel into said environment in place of said reaction vessel, the container having a temperature sensor operationally coacting with a fluid in said container; and
   changing an electrical parameter of the temperature sensor proportional to the temperature of the container.

2. A method as in claim 9 wherein the method further includes measuring said electrical parameter and determining the temperature of said container according to the measured electrical parameter.

3. A temperature measurement apparatus for indicating the temperature of an environment wherein said environment is adapted to receive and support a reaction vessel and said reaction vessel is adapted to hold chemicals during a chemical reaction, said apparatus comprising:
   a container having an external shape and size substantially identical to said reaction vessel;
   a fluid in said container for transferring heat energy; and
   temperature sensing means operationally coating with said fluid in said container, said temperature sensing means being in thermodynamic communication with said fluid for changing a parameter of said temperature sensing means in response to the temperature of said fluid.

4. A temperature measurement apparatus as in claim 1 wherein said apparatus further includes electrical conductors for transmitting an electrical signal and thermal insulating means for reducing thermal conductivity between said temperature sensing means and said electrical conductors.

5. A temperature measurement apparatus as in claim 4 wherein said thermal insulating means includes a board and serpentine conductors carried by said board, said serpentine conductors being connected between said temperature sensing means and said electrical conductors.

6. A temperature measurement apparatus for indicating the temperature of an environment wherein said environment is adapted to receive and support a reaction vessel and said reaction vessel is adapted to hold chemicals during a reaction, said apparatus comprising:
   a container having an external shape and size substantially identical to said reaction vessel, said container being adapted to be received in said environment in place of said reaction vessel;
   a fluid in said container for transferring heat energy; and
   temperature sensing means operationally coacting with said fluid in said container, said temperature sensing means being in thermodynamic communication with said fluid for changing a parameter of said temperature sensing means in response to the temperature of said fluid.

7. A temperature measurement apparatus as in claim 6 wherein said apparatus further includes electrical conductors for transmitting an electrical signal and thermal insulating means for reducing thermal conductivity between said temperature sensing means and said electrical conductors.

8. A temperature measurement apparatus as in claim 7 wherein said thermal insulating means includes a board and serpentine conductors carried by said board, said serpentine conductors being connected between said temperature sensing means and said electrical conductors.

* * * * *